United States Patent
Mohr et al.

(10) Patent No.: US 6,777,527 B1
(45) Date of Patent: Aug. 17, 2004

(54) POLYMERS THAT CONTAIN ALCOXYLATED, CONDENSED ALKALINE AMINO ACIDS AND METHOD OF PRODUCING SAID POLYMERS

(75) Inventors: Bernhard Mohr, Heidelberg (DE); Dieter Boeckh, Limburgerhof (DE); Oliver Borzyk, Speyer (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/926,568

(22) PCT Filed: May 12, 2000

(86) PCT No.: PCT/EP00/04293

§ 371 (c)(1),
(2), (4) Date: Nov. 19, 2001

(87) PCT Pub. No.: WO00/71601

PCT Pub. Date: Nov. 30, 2000

(51) Int. Cl.⁷ .............................................. C08C 69/10
(52) U.S. Cl. ....................... 528/328; 528/310; 528/332; 528/345; 528/354
(58) Field of Search ................................. 528/328, 310, 528/332, 345, 354

(56) References Cited

U.S. PATENT DOCUMENTS

| | | |
|---|---|---|
| 3,313,736 A | 4/1967 | Dickson et al. |
| 4,551,506 A | 11/1985 | Gosselink |
| 4,891,160 A | 1/1990 | Vander Meer |
| 6,034,204 A * | 3/2000 | Mohr et al. |

FOREIGN PATENT DOCUMENTS

| | | |
|---|---|---|
| DE | 22 27 546 | 4/1972 |
| EP | 0 112 593 | 7/1984 |
| EP | 0 980 862 | 2/2000 |
| JP | 54-148898 | 11/1979 |
| WO | 97/23546 | 4/1997 |
| WO | 97 20879 | 6/1997 |
| WO | 99 07813 | 2/1999 |

\* cited by examiner

*Primary Examiner*—Duc Truong
(74) *Attorney, Agent, or Firm*—Oblon, Spivak, McClelland, Maier & Neustadt, P.C.

(57) ABSTRACT

Alkoxylated, condensed basic amino acid-containing polymers comprising the addition products of alkylene oxides with homocondensates of basic amino acids, condensates of mixtures of two or more basic amino acids and cocondensates of basic amino acids and cocondensable compounds, and a process for the production of alkoxylated, condensed basic amino acid-containing polymers which comprises reacting homocondensates of basic amino acids, condensates of mixtures of two or more basic amino acids and cocondensates of basic amino acids and cocondensable compounds with at least one alkylene oxide selected from the group consisting of $C_2$- and $C_{30}$-alkylene oxides and styrene oxide.

20 Claims, No Drawings

POLYMERS THAT CONTAIN ALCOXYLATED, CONDENSED ALKALINE AMINO ACIDS AND METHOD OF PRODUCING SAID POLYMERS

TECHNICAL FIELD

The present invention relates to alkoxylated, condensed basic amino acid-containing polymers and a process for their production.

BACKGROUND OF THE INVENTION

Ethoxylated polyamines, especially polyethyleneimines and processes for their production are known, cf. U.S. Pat. No. 3,313,736, U.S. Pat. No. 4,891,160, U.S. Pat. No. 4,551,506 and WO-A-97/23546. The ethoxylated polyamines are for example used in cleaning compositions.

DE-A-2 227 546 relates to the use of alkoxylated polyalkyleneimines for the dehydration of crude oils. The alkoxylated polyalkyleneimines are prepared by a two-stage process in which, in the first stage, one mole of an alkylene oxide, based on one mole of NH groups in the polyethyleneimine, is reacted with a polyalkylenepolyamine in the presence of water with formation of hydroxyalkyl groups. In the second process stage water is initially removed from the reaction mixture, an alkaline catalyst added, alkylene oxide forced in and the reaction carried out under pressure at temperatures between 125° and 135° C. From 10 to 300 alkylene oxide units are added per NH group. Alternatively, the alkoxylation can be carried out in a single stage, by forcing in alkylene oxide in the presence of aqueous or anhydrous alkaline catalysts and causing it to react under pressure with polyethyleneimines at temperatures between 125 and 135° C.

EP-A-0,112,593 relates to detergent formulations containing ethoxylated amines. In this case the preparation of the alkoxylated amines likewise takes place in two stages, a hydroxyethylated polyethyleneimine being produced in the first stage by the action of ethylene oxide and the necessary amount of ethylene oxide being added in the second stage by further addition of ethylene oxide at temperatures ranging from 130 to 140° C. under super-atmospheric pressure. The degree of ethoxylation is for example from 15 to 42.

WO-A-97/20879 relates to a process for the preparation of hydroxyalkylated polyethyleneimines by hydroxyalkylation of polyethyleneimines in one or two procedural stages to form reaction products which contain 1 to 200 mol of alkylene oxide groups per NH group in the polyethyleneimine. In the one-stage process, there are anhydrous polyethyleneimines and 1 to 200 mol %, in relation to the polyethyleneimines, of at least one anhydrous base, or aqueous solutions of said substances are dehydrated and after removing all the water are reacted at temperatures above 135–150° C. with at least one alkylene oxide. Alternatively, in the two-stage process, in the first stage polyethyleneimine is reacted at temperatures from 80 to 100° C. with 0.7 to 0.9 mol, in relation to one mole of NH groups in the polymer, of at least one alkylene oxide in an aqueous solution, and in the second stage the reaction product obtained in the first step in reacted in the presence of 1 to 20 mol %, in relation to polyethyleneimine, of an alkaline catalyst in the absence of water at temperatures from 120 to 150° C. with at least one alkylene oxide to form hydroxyalkylated polyethyleneimines which contain 1 to 200 mol of alkylene oxide groups per NH group in the polyethyleneimine. The resulting alkoxylated products are only slightly colored.

U.S. patent application Ser. No. 09/131,234 relates to an amino acid based polymer, oligomer or copolymer containing at least 5 mol % of units of a basic amino acid selected from the group consisting of lysine, arginine, ornithine; tryptophan and mixtures thereof and at least about 5 mol % of a polymerizable compound selected from the group consisting of aliphatic or cycloaliphatic amines, alicyclic amines, diamines, triamines, tetraamines, aliphatic amino alcohols or mixtures thereof. The said polymers, oligomers or copolymers are obtained by condensing said basic amino acids at a temperature of at least 120° C. with at least one of said polymerizable compounds. The condensation products may be used as additives for detergents and/or other laundry additives.

U.S. patent application Ser. No. 09/131,282 relates to condensation products of basic amino acids with copolymerizable compounds which are obtained by condensing (a) a basic amino acid selected from the group consisting of lysine, arginine, ornithine, tryptophan and mixtures thereof, (b) a copolymerizable compound selected from the group consisting of saturated monobasic carboxylic acids, unsaturated mono-basic carboxylic acids, polybasic carboxylic acids, carboxylic anhydrides, diketenes, monohydroxycarboxylic acids, polyhydroxycarboxylic acids and mixtures thereof, and optionally (c) at least one compound selected from the group consisting of amines, lactams, non-proteinogenic amino acids, alcohols, alkoxylated alcohols, alkoxylated amines, amino sugars, carbohydrates and sugar carboxylic acids in a molar ratio of (a):(b) of from 100:1 to 1:1 at a temperature of at least 120° C. The condensation products may be used as an additive in detergents.

It is an object of the present invention to provide new condensation products of basic amino acids.

SUMMARY OF THE INVENTION

We have found that the above object is achieved with alkoxylated, condensed basic amino acid-containing polymers comprising the addition products of alkylene oxides with homocondensates of basic amino acids, condensates of mixtures of two or more basic amino acids and cocondensates of basic amino acids and cocondensable compounds.

We have found that the object is also achieved with a process for the production of alkoxylated, condensed basic amino acid-containing polymers by reacting homocondensates of basic amino acids, condensates of mixtures of two or more basic amino acids and cocondensates of basic amino acids and cocondensable compounds with at least one alkylene oxide selected from the group consisting of $C_2$- to $C_{30}$-alkylene oxides and styrene oxide. The alkoxylated, condensed basic amino acid-containing polymers may be used as additives for detergents.

DETAILED DESCRIPTION OF THE INVENTION

In order to produce condensed basic amino acid-containing polymers, basic amino acids are preferably condensed thermally. Other methods for the production of basic amino acid-containing polymers are based on chemical methods (e.g. via N-carboxy anhydrides of the basic amino acids) or on microorganisms. Basic amino acids, which are hereinafter referred to as compounds of group (a), are lysine, arginine, ornithine, tryptophan and their mixtures. These compounds may be used in the form of their hydrates, their esters with lower alcohols or their salts, for instance their sulfates, hydrochlorides or acetates. The esters of the basic amino acids are preferably derived from monovalent $C_1$ to $C_4$-alcohols such as methanol, ethanol, n-propanol, isopropanol, n-butanol, sec.-butanol or tert-butanol. When hydrochlorides are used, approximately equivalent quantities of a base should be added to the reaction mixture for neutralization of hydrogen chloride. Sodium hydroxide and potassium hydroxide are the preferred bases. If a monohydrochloride of a basic amino acid is used, one equivalent of a base is necessary, whereas in the case of dihydrochlorides two equivalents are required. Lysine hydrate and aqueous solutions of lysine are preferably used as basic amino acid. Lysine can also be used in the form of its cyclic lactam, i.e. α-amino-t-caprolactam.

Compounds which are cocondensable with basic amino acids are hereinafter referred to as compounds of group (b), for example compounds having at least one carboxyl group, carboxylic anhydrides, diketenes, amines, lactams, alcohols, alkoxylated alcohols and alkoxylated amines. Carboxyl-containing compounds are for instance saturated monobasic carboxylic acids, unsaturated monobasic carboxylic acids, polybasic carboxylic acids, monohydroxycarboxylic acids, monobasic polyhydroxycarboxylic acids, non-proteinogenic amino acids and mixtures thereof. Examples of saturated monobasic carboxylic acids are formic acid, acetic acid, propionic acid, butyric acid, valeric acid, capric acid, octanoic acid, nonanoic acid, decanoic acid, lauric acid, palmitic acid, stearic acid, arachidic acid, behenic acid, myristic acid, undecanoic acid, 2-ethylhexanoic acid, and all naturally occurring fatty acids and mixtures thereof.

Examples of unsaturated monobasic carboxylic acids are acrylic acid, methacrylic acid, crotonic acid, sorbic acid, oleic acid, linoleic acid, and erucic acid.

Examples of polybasic carboxylic acids are oxalic acid, fumaric acid, maleic acid, malonic acid, succinic acid, itaconic acid, adipic acid, aconitric acid, suberic acid, azeleic acid, pyridinedicarboxylic acid, furandicarboxylic acid, phthalic acid, terephthalic acid, diglycolic acid, glutaric acid, substituted $C_4$-dicarboxylic acid, sulfosuccinic acid, $C_1$- to $C_{26}$-alkylsuccinic acids, $C_2$- to $C_{26}$-alkenylsuccinic acids, 1,2,3-propanetricarboxylic acids, 1,1,3,3-propanetetracarboxylic acids, 1,1,2,2-ethanetetracarboxylic acid, 1,2,3,4-butanetetracarboxylic acid, 1,2,2,3-propanetetracarboxylic acid, 1,3,3,5-pentanetetracarboxylic acid, 1,2,4-benzenetricarboxylic acid, and 1,,2,4,5-benzenetetracarboxylic acid.

Examples of monohydroxycarboxylic acids are malic acid, tartronic acid, citric acid, and isocitric acid. Polyhydroxycarboxylic acids are for example tartaric acid, mucic acid, glyceric acid, bis(hydroxymethyl)propionic acid, gluconic acid, and hydroxylated unsaturated fatty acids such as dihydroxystearic acid.

Other carboxyl-containing compounds are non-proteinogenic amino acids. Examples of such acids are anthranilic acid, N-methylamino-substituted acids such as N-methylglycine, dimethylaminoacetic acid, ethanolaminoacetic acid, N-carboxymethylamino acids, nitrilotriacetic acid, ethylenediamineacetic acid, ethylenediaminotetraacetic acid, diethylentriaminepentaacetic acid, hydroxyethylenediaminotriacetic acid, diaminosuccinic acid, $C_4$- to $C_{26}$-aminoalkylcarboxylic acids such as 4-aminobutyric acid, 6-aminocaproic acid, and 11-aminoundecanoic acid.

Other carboxyl-containing compounds which differ from basic amino acids and α-amino acids and which can be condensed with basic amino acids are sugar carboxylic acids such as gluconic acid, glucaric acid, gluconolactone, and glucuronic acid.

Carboxylic anhydrides are also suitable as cocondensable compounds, for example succinic anhydride, mono- and dianhydride of butanetetracarboxylic acid, phthalic anhydride, acetylcitric anhydride, maleic anhydride, itaconic anhydride, and aconitic anhydride.

Examples of diketenes which may be used as cocondensable compounds are alkyldiketenes having 1 to 30 carbon atoms in the alkyl group. These diketenes may be characterized by the following formula:

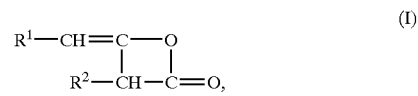

in which the substituents $R^1$ and $R^2$ have the same meaning or are different and are H, saturated or ethylenically unsaturated $C_1$- to $C_{30}$-, preferably $C_6$- to $C_{22}$-alkyl. Compounds of the formula (I) are for example diketene, methyldiketene, hexyldiketene, cyclohexyldiketene, octyldiketene, decyldiketene, dodecyldiketene, palmityldiketene, stearyldiketene, oleyldiketene, octadecyldiketene, eicosyldiketene, docosyldiketene, and behenyldiketene.

Examples of amines are:

aliphatic and cycloaliphatic amines, preferably methylamine, ethylamine, propylamine, butylamine, pentylamine, hexylamine, heptylamine, octylamine, nonylamine, decylamine, undecylamine, dodecylamine, tridecylamine, stearylamine, palmitylamine, 2-ethylhexylamine, isononylamine, hexamethyleneimine, dimethylamine, diethylamine, dipropylamine, dibutylamine, dihexylamine, ditridecylamine, N-methylbutylamine, N-ethylbutylamine, alicyclic amines, preferably cyclopentylamine, cyclohexylamine, N-methylcyclohexylamine, N-ethylcyclohexylamine, dicyclohexylamine;

diamines, triamines and tetraamines, preferably ethylenediamine, propylenediamine, butylenediamine, neopentyldiamine, hexamethylenediamine, octamethylenediamine, imidazole, 5-amino-1,3-trimethylcyclohexylmethylamine, diethylenetriamine, dipropylenetriamine, tripropyltetraamine, 4,4'-methylenebiscyclohexylamine, 4,4'-methylenebis(2-methylcyclohelylamine), 4,7-dioxadecyl-1,10-diamine, 4,9-dioxadodecyl-1,12-diamine, 4,7,10-trioxatridecyl-1,13-diamine, 2-(ethylamino)ethylamine, 3-(methylamino)propylamine, 3-(cyclohexylamino)propylamine, 3-(2-aminoethyl)aminopropylamine, 2-(diethylamino)ethylamine, 3-(dimethylamino)propylamine, dimethyldipropylenetriamine, 4-aminomethyloctane-1,8-diamine, 3-(diethylamino)propylamine, N,N-diethyl-1,4-pentanediamine, diethylenetriamine, dipropylenetriamine, bis(hexamethylene)triamine, aminoethylpiperazine, aminopropylpiperazine, N,N-bis(aminopropyl)methylamine, N,N-bis(aminopropyl)

ethylamine, N,N-bis(aminopropyl)hexylamine, N,N-bis(aminopropyl)octylamine, N,N-dimethyldipropylenetriamine, N,N-bis(3-dimethylaminopropyl)amine, N,N'-1,2-ethanediylbis(1,3-propanediamine), N-(aminoethyl)piperazine, N-(2-imidazole)piperazine, N-ethylpiperazine, N-(hydroxyethyl)piperazine, N-(aminoethyl)piperazine, N-(aminopropyl)piperazine, N-(aminoethyl)morpholine, N-(aminopropyl)morpholine, N-(aminoethyl)imidazole, N-(aminopropyl)imidazole, N-(aminoethyl)hexamethylenediamine, N-(aminopropyl)hexamethylenediamine, N-(aminoethyl)ethylenediamine, N-(aminopropyl)ethylenediamine, N-(aminoethyl)butylenediamine, N-(aminopropyl)butylenediamine, bis(aminoethyl)piperazine, bis(aminopropyl)piperazine, bis(aminoethyl)hexamethylenediamine, bis(aminopropyl)hexamethylenediamine, bis(aminoethyl)ethylenediamine, bis(aminopropyl)ethylenediamine, bis(aminoethyl)butylenediamine, bis(aminopropyl)butylenediamine, aliphatic amino alcohols, preferably 2-aminoethanol, 3-amino-1-propanol, 1-amino-2-propanol, 2-(2-(aminoethoxy)ethanol, 2-[2-aminoethyl)amino]ethanol, 2-methylaminoethanol, 2-(ethylamino)ethanol, 2-butylaminoethanol, diethanolamine, 3-[(hydroxyethyl)amino]-1-propanol, diisopropanolamine, bis(hydroxyethyl)aminoethylamine, bis(hydroxypropyl)aminoethylamine, bis(hydroxyethyl)aminopropylamine, bis(hydroxypropyl)aminopropylamine;

amino sugars such as chitosan or chitosamine, and also compounds obtained from reducing carbohydrates by reductive amination, such as aminosorbitol or glucoseamine, and other amino-containing compounds such as melamine, urea, guanidine, polyguanides, piperidine, morpholine, 2,6-dimethylmorpholine and tryptamine.

Preferred amines are selected from hexamethylenediamine, octylamine, monoethanolamine, octamethylenediamine, diaminododecane, decylamine, dodecylamine and mixtures thereof.

Other compounds which are cocondensable with basic amino acids are lactams. The lactams contain for example 5 to 13 atoms in the ring. Suitable lactams include butyrolactam, caprolactam and laurolactame.

Other compounds which are cocondensable with basic amino acids are alcohols. The alcohols may be derived from monohydric alcohols, for example for primary, secondary or tertiary alcohols having 1 to 22 carbon atoms, e.g. methanol, ethanol, n-propanol, isopropanol, n-butanol, isobutanol, tert-butanol, pentanol, hexanol, 2-ethylhexanol, cyclohexanol, octanol, decanol, dodecanol, palmityl alcohol, stearyl alcohol, and behenyl alcohol. Other suitable alcohols are polyols such as ethylene glycol, propylene glycol, glycerol, polyglycerols having 2 to 8 glycerol units, erythritol, pentaerythritol, and sorbitol.

Other cocondensable compounds are carbohydrates such as glucose, sucrose, dextrins, starch and degraded starch, and maltose.

The alcohols may also be alkoxylated. Examples of such compounds are the addition products of from 1 to 200 mol of a $C_2$- to $C_4$-alkylene oxide with one mole of the alcohol mentioned. Suitable alkylene oxides are for example ethylene oxide, propylene oxide and butylene oxides. Preference is given to using ethylene oxide and propylene oxide, or to adding ethylene oxide and propylene oxide or vice versa to the alcohol. Of interest are in particular the addition products of 3 to 20 mol of ethylene oxide with 1 mol of a $C_{13}/C_{15}$ oxo process alcohol or with fatty alcohols. The alcohols may if desired also contain a double bond, such as oleyl alcohol.

The basic amino acids can also be condensed with alkoxylated amines, for example the addition products of from 5 to 30 mol of ethylene oxide with 1 mol of stearylamine, oleylamine or palmitylamine.

The alkoxylated, condensed amino acid-containing polymers of the compounds of groups (a) and (b) contain them for example in a molar ratio of from 100:1 to 1:10 and preferably in a molar ratio of (a) to (b) which is greater than 1, for example more than 1.5 and preferably more than 2. The molar ratio of (a):(b) of from 1:1 to 1:10 is preferably used if compounds (b) contain at least two different functional groups. Examples of such compounds (b) are non-proteinogenic amino acids, lactams, amino alcohols, hydroxycarboxylic acids and amino sugars.

Preferred condensation products which are used as starting material for the production of the alkoxylated, condensed basic amino acid-containing polymers are homocondensates of basic amino acids and cocondensates which are obtainable by condensing (a) lysine and (b) at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof, and also condensation products which are obtainable by condensing (a) lysine and (b) at least one compound selected from the group consisting of 1,6-hexandiamine, octylamine, aminocaproic amine, aminolauric acid, ε-caprolactam, laurolactam, and $C_{14}$-/$C_{22}$- alkyldiketenes.

In order to obtain the starting material for the preparation of the alkoxylated, condensed basic amino acid-containg polymers the condensation of the basic amino acids, their mixtures or of at least one basic amino acid with at least one cocondensable compound can be carried out in bulk, in an organic solvent or in an aqueous medium. It is of advantage to conduct the condensation in water at a concentration of the compounds to be condensed of from 10 to 98% by weight at a temperature of from 120° to 300° C. In a preferred embodiment of the process the condensation is carried out in water at a concentration of the compounds to be condensed of from 20 to 70% by weight under pressure at a temperature of from 140° to 250° C. The condensation of these compounds can also be carried out in an organic solvent such as dimethylformamide, dimethyl sulfoxide, dimethylacetamide, glycol, polyethylene glycol, propylene glycol, polypropylene glycol, monovalent alcohols, addition products of ethylene oxide and/or propylene oxide with monovalent alcohols, with amines or with carboxylic acids. Some of these solvents may react with the basic amino acids.

The condensation can, for example, be started in the presence of water either in an aqueous solution or in an organic solvent containing water. The condensation of the compounds can then further be carried out in the presence of water. Alternatively, water may be distilled off before the compounds are condensed. The condensation can also be carried out with removal of water which is formed during the condensation. The water formed during the condensation is preferably removed from the reaction mixture. This can be carried out under superatmospheric pressure, under normal pressure or under reduced pressure. The condensation time depends on the choice of reaction conditions. In general it will be within the range from 1 minute to 50 hours, preferably from 30 minutes to 16 hours. Polycondensates having a low molecular weight can also be prepared in a pressure-tightly sealed vessel by removing only some if any of the water formed in the coarse of the polycondensation.

If desired, the condensation can also be carried out in the presence of a mineral acid as catalyst. The concentration of the mineral acid may be from 0.001 to 5, preferably from 0.01 to 1.0% by weight. Examples of suitable mineral acids are hypophosphorus acid, hypodiphosphorous acid, phosphorous acid, hydrochloric acid, sulfuric acid and their mixtures. In addition to the acids their alkali metal, ammonium and alkaline earth metal salts can also be used as catalyst.

The condensation products of homocondensates of basic amino acids condensates of mixtures of two or more basic amino acids and cocondensates of basic amino acids and cocondensable compounds used as starting materials for the preparation of the alkoxylated, condensed basic amino acid-containing polymers have for example a weight average molecular weight Mw of from 300 to 1,000,000, preferably of from 300 to 20,000 and most preferably of from 300 to 2,000. They are generally soluble in water or can be easily dispersed therein. The amino groups of the starting material can be present as free amine or in the form of their ammonium salts which may be obtained by partial or complete neutralization with a mineral acid, e.g. hydrochloric acid, phosphoric acid or sulfuric acid or with an organic acid such as methanesulfonic acid, acetic acid, formic acid, propionic acid or citric acid.

The condensed basic amino acid-containing compounds such as homocondensates of basic amino acids, condensates of mixtures of two or more basic amino acids and cocondensates of basic amino acids and cocondensable compounds are modified by alkoxylation so that they contain units of alkylene oxides selected from the group consisting of $C_2$- to $C_{30}$-alkylene oxides and styrene oxide. The alkylene oxides are preferably selected from the group consisting of ethylene oxide, propylene oxide, butylene oxides and mixtures thereof. The alkoxylated, condensed basic amino acid-containing polymers contain per mole of NH bonds of primary and secondary amino groups of the starting material 0.1 to 100, preferably 0.5 to 30, mol of an alkylene oxide added, i.e. in condensed form. The most preferred alkylene oxides are ethylene oxide, propylene oxide and mixtures thereof. Most preferred are polymers which contain 0.7 to 2.5 or 17 to 25 mol of an alkylene oxide per NH bond.

The alkoxylation reaction can be carried out according to prior art methods for modifying polyethyleneimine in a single-stage or two-stage process.

When operating in a single stage the starting material (the above-described condensed basic amino acid-containing compounds) and at least one anhydrous base are heated under pressure and normally under a blanket of nitrogen in an autoclave together with an alkylene oxide at temperatures between 80° and 180° C., preferably of from 100 to 150° C. If the starting material and the basic catalyst are present in an aqueous solution, then water is distilled off, preferably under reduced pressure, and then residue is dried before it is alkoxylated. The removal of water may be carried out by means of azeotropic distillation, for example by adding an entraining agent such as benzene, toluene or xylene.

When operating is two stages then the NH groups of the starting material are first hydroxyalkylated by reacting the starting material with from 0.7 to 1.2, preferably 0.85 to 1.1 mol, based on one mole of N—H bonds in the polymer, of at least one alkylene oxide in an aqueous solution in the first process stage at temperatures ranging from 80 to 140° C. The reaction product thus obtained contains from 0.1 to 1 mol of alkylene oxide units per N—H bond of the starting material and, if desired, is caused in the second process stage to react with at least one alkylene oxide to produce alkoxylated, condensed basic amino acid-containing polymers having more than one, preferably 2 to 100, mol of alkylene oxide units per N—H bond in the polymer. In the second step the reaction is carried out in the presence of an alkaline catalyst and in the absence of water at temperatures ranging from 100 to 150° C. The alkoxylation in the first process stage is for example complete after a period of from 1 to 10, preferably 1.5 to 8, hours. In the second process stage the duration of the reaction is for example from 2 to 30, preferably from 3 to 18, hours. The alkoxylation in the first stage of the process usually takes place under standard pressure but may alternatively be carried out at pressures of up to 20 bar in an autoclave. In the single-stage process and in the second step of the two-stage process the alkoxylation is carried out under pressures above 1 bar up to 20 bar and preferably at from 2 to 10 bar.

Suitable alkaline catalysts for the alkoxylation are for example alkali metal hydroxides such as sodium hydroxide and potassium hydroxide, alkali metal alcoholates such as sodium or potassium methanolate, potassium ethanolate, potassium isopropanolate, and potassium t-butylate. Alternatively, the corresponding sodium alcoholates can be used instead of the potassium salts or as a mixture with them. In addition sodium hydride and hydrotalcite, optionally modified, are suitable for use as catalyst. Calcium oxide or barium oxide are further examples of alkaline catalysts. The amount of alkaline catalyst is, for example, from 0.5 to 20, preferably from 1 to 15, mol %, based on the N—H bonds of the condensed amino acid-containing polymers. The alkoxylation may be carried out in a solvent. Suitable solvents are for instance water, alcohols such as methanol, ethanol, isopropanol, n-propanol and isobutanol, and hydrocarbons such as toluene and xylene. When the reaction is completed the catalyst and the solvent, if used, are removed.

The alkoxylated, condensed basic amino acid-containing polymers may be modified by reacting them with an alkylating agent selected from the group consisting of alkyl halides, benzyl halides and dialkyl sulfates. Suitable alkyl halides are for example $C_1$- to $C_{22}$-alkyl halides. Preferred alkylating agents are benzyl chloride, methyl chloride, ethyl chloride, lauryl chloride, palmityl chloride, stearyl chloride, methyl iodide, dimethyl sulfate, and diethyl sulfate.

The alkoxylated, condensed basic amino acid-containing polymers and their alkylated derivatives are used as additives for detergents.

The alkoxylated, condensed basic amino acid-containing polymers of the invention have, compared with most of the cationic surfactants, a reduced algae toxicity.

The weight average molecular weights (Mw) were measured by aqueous gel permeation chromatography (GPC) using a mixture of acetonitrile and water 20/80 v/v as the mobile phase, Waters Ultrahydrogel 500, 250, 250 and 120 columns and UV detection at a wavelength of 230 nm.

Pullulane standards with narrow molecular weight distributions were used for the calibration.

The content of amine functionalities was determined by potentiometric titration with a standard solution of alcoholic trifluoromethanesulfonic acid.

EXAMPLES

Condensate 1

Condensation product of L-lysine

L-lysine monohydrate (821 g, 5.0 mol) and sodium hypophosphite (0.1 g) were placed in a pressurizable 2.5 l reaction vessel and blanketed with nitrogen. The reaction vessel was then sealed pressure-tight and heated at 170° C. for 6 h, during which time the internal pressure rose to 3.15 bar. The pressure was then slowly released to atmospheric pressure to remove water from the reaction mixture. The reaction temperature was kept at 170° C. for 0.5 h to remove residual amounts of solvent and volatile products. The viscous melt was cooled to 115° C. and 500 g of water were added slowly to result in a clear yellow solution, which was then cooled to ambient temperature. The polymer solution obtained had a solids content of 56.8%. The molecular weight of the polymer was determined to be Mw=1930 g/mol.

Condensate 2

Condensation product of L-lysine

L-lysine monohydrate (985.2 g, 6.0 mol) and sodium hypophosphite (0.1 g) were placed in a pressurizable 2.5 l reaction vessel and blanketed with nitrogen. The reaction vessel was then sealed pressure-tight and heated at 196° C. for 7 h, during which time the internal pressure rose to 11.55 bar. The pressure was then slowly released to atmospheric pressure to remove water from the reaction mixture. The reaction temperature was kept at 180° C. for 0.5 h to remove residual amounts of solvent and volatile products. The resulting viscous melt was removed from the reaction vessel and then cooled to ambient temperature. The molecular weight of the polymer was determined to be Mw=5820 g/mol.

Condensate 3

Condensation product of L-lysine and aminocaproic acid in a molar ratio of 1:1.

L-lysine monohydrate (656.8 g, 4.0 mol), aminocaproic acid (524.7 g, 4.0 mol) and sodium hypophosphite (0.1 g) were placed in a pressurizable 2.5 l reaction vessel and blanketed with nitrogen. The reaction vessel was then sealed pressure-tight and heated at 196° C. for 7 h, during which time the internal pressure rose to 7.65 bar. The pressure was then slowly released to atmospheric pressure to remove volatile materials from the reaction mixture. The resulting viscous melt was removed from the reaction vessel and then cooled to ambient temperature. The molecular weight of the polymer was determined to be Mw=3970 g/mol.

Condensate 4

Condensation product of L-lysine and epsilon-caprolactam in a molar ratio of 1:1

L-lysine monohydrate (492.6 g, 3.0 mol), epsilon-caprolactam (339.5 g, 3.0 mol) and sodium hypophosphite (0.1 g) were placed in a pressurizable 2.5 l reaction vessel and blanketed with nitrogen. The reaction vessel was then sealed pressure-tight and heated at 170° C. for 6 h, during which time the internal pressure rose to 2.1 bar. The pressure was then slowly released to atmospheric pressure to remove volatile materials from the reaction mixture. The reaction was then continued for 30 min at 180° C. and atmospheric pressure. The resulting viscous melt was cooled to 90° C., removed from the reaction vessel and then cooled to ambient temperature. The molecular weight of the polymer was determined to be Mw=4020 g/mol.

Condensate 5

Condensation product of L-lysine and hexamethylenediamine in a molar ratio of 5:1

L-lysine monohydrate (492.6 g, 3.0 mol), hexamethylene diamine (69.6 g, 0.6 mol) and sodium hypophosphite (0.1 g) were placed in a pressurizable 2.5 l reaction vessel and blanketed with nitrogen. The reaction vessel was then sealed pressure-tight and heated at 180° C. for 6 h, during which time the internal pressure rose to 4.1 bar. The pressure was then slowly released to atmospheric pressure to remove volatile materials from the reaction mixture. The reaction was then continued for 30 min at 180° C. and atmospheric pressure. The resulting viscous melt was cooled to 90° C., removed from the reaction vessel and then cooled to ambient temperature. The molecular weight of the polymer was determined to be Mw=5140 g/mol.

Example 1

Polylysine•2EO 400 g of a 56.8% aqueous solution of condensate 1 were placed in a pressurizable 3.5 l reaction vessel and blanketed with nitrogen. The reaction vessel was then sealed pressure-tight and heated to 120° C. 100 g (2.27 mol) of ethylene oxide were added to the reaction vessel, during which the internal pressure rose to 8.0 bar. The reaction mixture was kept at 120° C. for 2 h, cooled to ambient temperature and then released to atmospheric pressure. Evaporation of solvent and volatile products under a water pump vacuum yielded 317 g of a highly viscous, orange solution.

Example 2

Polylysine•20EO 150 g of the product described in Example 1 and 5.3 g of potassium hydroxide were mixed and placed in a pressurizable 3.5 l reaction vessel. The reaction vessel was then sealed pressure-tight and heated to 120° C. 916 g (20.81 mol) of ethylene oxide were added over a period of 2 h to the reaction vessel, during which the internal pressure rose to 8.0 bar. The reaction mixture was kept at 120° C. for 18 h and then cooled to ambient temperature and released to atmospheric pressure. Evaporation of solvent and volatile products under a water pump vacuum yielded 1051 g of a viscous, dark orange oil.

Example 3

Polylysine•1PO 335.4 g of condensate 2 were dissolved in 535 ml of methanol and placed in a pressurizable 3.5 l reaction vessel. The reaction vessel was then flushed with nitrogen, sealed pressure-tight and heated to 100° C. 87.4 g (1.51 mol) of propylene oxide were then added to the reaction vessel, during which the internal pressure rose to 4.6 bar. The reaction mixture was kept at 100° C. for 2 h, cooled to ambient temperature and then released to atmospheric pressure to yield 945.8 g of a dark orange solution.

Example 4

Polylysine-co(aminocaproic acid)•1.6 PO 300 g of condensate 3 were dissolved in 300 ml of methanol, placed in a pressurizable 3.5 l reaction vessel and blanketed with nitrogen. The reaction vessel was then sealed pressure-tight and heated to 100° C. 115 g (1.98 mol) of propylene oxide were then added to the reaction vessel, during which the internal pressure rose to 4.6 bar. The reaction mixture was kept at 100° C. for 18 h, cooled to ambient temperature and then released to atmospheric pressure. Evaporation of solvent and volatile products under a water pump vacuum yielded 374 g of a dark orange, highly viscous oil.

Example 5

Polylysine-co(caprolactam)•2EO 850 g of a 63.9% aqueous solution of condensate 4 were placed in a pressurizable 3.5 l reaction vessel and blanketed with nitrogen. The reaction vessel was then sealed pressure-tight and heated to 120° C. 187.8 g (4.27 mol) of ethylene oxide were then added to the reaction vessel, during which the internal pressure rose to 8.0 bar. The reaction mixture was kept at 120° C. for 2 h, cooled to ambient temperature and then released to atmospheric pressure. Evaporation of solvent and volatile products under a water pump vacuum yielded 710 g of a light orange, highly viscous oil.

Example 6

Polylysine-co(hexamethylenediamine)•2EO 250 g of condensate 5 were dissolved in 300 ml of methanol and the solution was placed in a pressurizable 3.5 l reaction vessel and blanketed with nitrogen. The reaction vessel was then sealed pressure-tight and heated to 120° C. 176.2 g (4.0 mol) of ethylene oxide were then added to the reaction vessel, during which the internal pressure rose to 7.0 bar. The reaction mixture was kept at 120° C. for 2 h, cooled to ambient temperature and then released to atmospheric pressure. Evaporation of solvent and volatile products under a water pump vacuum yielded 401 g of a brownish, highly viscous oil.

Example 7

Modification of polylysine-co(caprolactam)•2EO with dimethyl sulfate 150 g of a 49.2% aqueous solution of the polymer obtained according to Example 5 were placed in a three-neck flask equipped with nitrogen inlet, reflux condenser, dropping funnel and magnetic stirrer. The solution was heated to 70° C. under nitrogen and 9.64 g of dimethyl sulfate were added slowly. Stirring was continued for 2 h, while the pH was kept at 8.0 by dropwise addition of 1.3 g of a 25% aqueous solution of sodium hydroxide. Cooling to room temperature yielded a light orange solution having a solids content of 56.8%.

Example 8

Modification of polylysine-co(caprolactam)•2EO with dimethyl sulfate 150 g of a 49.2% aqueous solution of the polymer obtained according to Example 5 were placed in a three-neck flask equipped with nitrogen inlet, reflux condenser, addition funnel and magnetic stirrer. The solution was heated to 75° C. under nitrogen and 5.35 g of dimethyl sulfate were added slowly. Stirring was continued for 2 h, while the pH was kept at 8.0 by dropwise addition of 0.7 g of a 25% aqueous solution of sodium hydroxide. Cooling to room temperature yielded a light orange solution having a solids content of 46.2%.

Example 9

Modification of polylysine-co(caprolactam)•2EO with benzyl chloride 150 g of a 49.2% aqueous solution of the polymer obtained according to Example 5 were placed in a three-neck flask equipped with nitrogen inlet, reflux condenser, addition funnel and magnetic stirrer. The solution was heated to 70° C. under nitrogen and 9.68 g of benzyl chloride were added slowly. Stirring was continued for 2 h, while the pH was kept at 8.0 by dropwise addition of 4.1 g of a 25% aqueous solution of sodium hydroxide. Cooling to room temperature yielded a light orange solution having a solids content of 49.9%.

Example 10

Modification of polylysine-co(caprolactam)•2EO with benzyl chloride 150 g of a 49.2% aqueous solution of the polymer obtained according to Example 5 were placed in a three-neck flask equipped with nitrogen inlet, reflux condenser, addition funnel and magnetic stirrer. The solution was heated to 70° C. under nitrogen and 5.38 g of benzyl chloride were added slowly. Stirring was continued for 2 h, while the pH was kept at 8.0 by dropwise addition of 2.7 g of a 25% aqueous solution of sodium hydroxide. Cooling to room temperature yielded a light orange solution having a solids content of 46.2%.

We claim:

1. An alkoxylated, condensed basic amino acid-containing polymer comprising the addition products of one or more alkylene oxides with one or more of a homocondensate of a basic amino acid, a condensate of a mixture of two or more basic amino acids, or a cocondensate of one or more basic amino acids and one or more cocondensable compounds.

2. An alkoxylated, condensed basic amino acid-containing polymer as claimed in claim 1, wherein the basic amino acids are selected from the group consisting of lysine, arginine, ornithine and tryptophan.

3. An alkoxylated, condensed basic amino acid-containing polymer as claimed in claim 1, wherein the basic amino acid is lysine.

4. An alkoxylated, condensed basic amino acid-containing polymer as claimed in claim 1, comprising a cocondensate of one or more basic amino acids and a cocondensable compound, wherein the cocondensable compound is selected from the group consisting of a compound containing one or more carboxylic acid groups, a carboxylic anhydride, a diketene, an amine, a lactam, an alcohol, an alkoxylated alcohol and an alkoxylated amines.

5. An alkoxylated, condensed basic amino acid-containing polymer as claimed in claim 1, wherein the condensed basic amino acid-containing polymers as obtained by condensing (a) lysine alone or (b) lysine and at least one compound selected from the group consisting of palmitic acid, stearic acid, lauric acid, octanoic acid, propionic acid, acetic acid, 2-ethylhexanoic acid, adipic acid, succinic acid, citric acid and mixtures thereof.

6. An alkoxylated, condensed basic amino acid-containing polymer as claimed in claim 1, wherein the condensed basic amino acid-containing polymer is obtained by condensing (a) lysine together with (b) at least one compound selected from the group consisting of 1,6-hexandiamine, octylamine, aminocaproic acid, aminolauric acid, ε-caprolactam, laurolactam, and a $C_{14}$-/$C_{22}$-alkyldiketene.

7. An alkoxylated, condensed basic amino acid-containing polymer as claimed in claim 1, wherein the condensed basic amino acid-containing polymer has a weight average molecular weight of from 300 to 1,000,000.

8. An alkoxylated, condensed basic amino acid-containing polymer as claimed in claim 1, comprising units of alkylene oxides selected from the group consisting of $C_2$- to $C_{30}$-alkylene oxides and styrene oxide.

9. An alkoxylated, condensed basic amino acid-containing polymer as claimed in claim 1, comprising units of alkylene oxides selected from the group consisting of ethylene oxide, propylene oxide, butylene oxides and mixtures thereof.

10. An alkoxylated, condensed basic amino acid-containing polymer as claimed in claim 1, wherein the condensed basic amino acid-containing polymer contains per mole of NH bonds of primary and secondary amino groups 0.1 to 100 mol of an alkylene oxide in condensed form.

11. An alkoxylated, condensed basic amino acid-containing polymer as claimed in claim 1, wherein the condensed basic amino acid-containing polymer contains per mole of NH bonds of primary and secondary amino groups 0.5 to 20 mol of an alkylene oxide in condensed form.

12. An alkoxylated, condensed basic amino acid-containing polymer as claimed in claim 1, comprising units of alkylene oxides selected from the group consisting of ethylene oxide, propylene oxide and mixtures thereof.

13. An alkoxylated, condensed basic amino acid-containing polymer as claimed in claim 6, wherein the molar ratio of (a) to (b) is from 100:1 to 1:10.

14. An alkoxylated, condensed basic amino acid-containing polymer as claimed in claim 6, wherein the molar ratio of (a) to (b) is greater than 1.

15. An alkoxylated, condensed basic amino acid-containing polymer as claimed in claim 1, obtained by reacting the basic amino acid-containing polymer with at least one alkylating agent selected from the group consisting of an alkyl halide, a benzyl halide and a dialkyl sulfate.

16. A process for the production of an alkoxylated, condensed basic amino acid-containing polymer, which comprises reacting one or more of a homocondensate of a basic amino acid, a condensate of a mixture of two or more basic amino acids, or a cocondensate of one or more basic amino acids and one or more cocondensable compounds, with at least one alkylene oxide selected from the group consisting of a $C_2$- to $C_{30}$-alkylene oxide and styrene oxide.

17. A process as claimed in claim 16, wherein the alkylene oxide is selected from the group consisting of ethylene oxide, propylene oxide and butylene oxide.

18. A process as claimed in claim 16, wherein the alkylene oxide is ethylene oxide.

19. A process as claimed in claim 16, further comprising reacting the polymer with an alkylating agent selected from the group consisting of an alkyl halide, a benzyl halide and a dialkyl sulfate.

20. A process as claimed in claim 16, further comprising:

reacting the polymer with a compound selected from the group consisting of benzyl chloride, methyl chloride, ethyl chloride, lauryl chloride, palmityl chloride, stearyl chloride, methyl iodide, dimethyl sulfate and diethyl sulfate.

* * * * *

UNITED STATES PATENT AND TRADEMARK OFFICE
CERTIFICATE OF CORRECTION

PATENT NO. : 6,777,527 B1  Page 1 of 1
DATED : August 17, 2004
INVENTOR(S) : Mohr et al.

It is certified that error appears in the above-identified patent and that said Letters Patent is hereby corrected as shown below:

<u>Title page,</u>
Item [62], Related U.S. Application Data, should read:
 -- Related U.S. Application Data
(62) This application is a 371 of PCT/EP00/04293, which is a 365 of U.S. application No. 09/314,116, filed on May 19, 1999. --

Signed and Sealed this

Fourth Day of January, 2005

JON W. DUDAS
*Director of the United States Patent and Trademark Office*